(12) United States Patent
Luczak

(10) Patent No.: US 9,676,636 B1
(45) Date of Patent: Jun. 13, 2017

(54) INK REMOVAL DEVICE

(71) Applicant: Jerry Luczak, Elkhorn, WI (US)

(72) Inventor: Jerry Luczak, Elkhorn, WI (US)

( * ) Notice: Subject to any disclaimer, the term of this patent is extended or adjusted under 35 U.S.C. 154(b) by 846 days.

(21) Appl. No.: 13/856,517

(22) Filed: Apr. 4, 2013

(51) Int. Cl.
| | |
|---|---|
| *B01D 21/00* | (2006.01) |
| *B01D 15/00* | (2006.01) |
| *B01D 29/00* | (2006.01) |
| *C02F 1/00* | (2006.01) |
| *C02F 1/26* | (2006.01) |
| *C02F 3/12* | (2006.01) |
| *C02F 1/58* | (2006.01) |
| *C02F 1/28* | (2006.01) |

(52) U.S. Cl.
CPC ............... *C02F 1/006* (2013.01); *C02F 1/26* (2013.01); *C02F 1/28* (2013.01); *C02F 1/58* (2013.01); *C02F 3/1278* (2013.01)

(58) Field of Classification Search
None
See application file for complete search history.

(56) References Cited

U.S. PATENT DOCUMENTS

| | | | | |
|---|---|---|---|---|
| 4,100,073 | A * | 7/1978 | Hopcroft .............. | B01D 23/00 210/170.08 |
| 4,909,932 | A * | 3/1990 | Monnet ............... | B01D 29/009 210/136 |
| 5,186,817 | A * | 2/1993 | Paspek .............. | B01D 11/0488 208/188 |
| 2004/0061747 | A1* | 4/2004 | Nakao ................. | B41J 2/17509 347/85 |
| 2005/0269254 | A1* | 12/2005 | Roitman ............. | B01D 5/0072 210/252 |

* cited by examiner

*Primary Examiner* — Richard Gurtowski
(74) *Attorney, Agent, or Firm* — Donald J. Ersler

(57) ABSTRACT

An ink removal device preferably includes a tube housing, a plurality of glass chunks and an injector tube. The injector tube is retained in the tube housing. A liquid inlet connector is secured to a first end of the tube housing for a supply of ink water. An air inlet connector is secured to a second end of the tube housing for a supply of pressurized air. The tube housing is filled with a plurality of large chunks of glass. Pressurized ink water is pumped into the tube housing passes through the injector tube and back through the plurality of glass chunks. The ink in the ink water adheres to the plurality of glass chunks to produce cleaned water. The pressurized air dries the ink adhering to the plurality of glass chunks. The cleaned water exits the outlet port to be used for printing operations.

9 Claims, 2 Drawing Sheets

INK REMOVAL DEVICE

BACKGROUND OF THE INVENTION

1. Field of the Invention

The present invention relates generally to printing and more specifically to an ink removal device, which removes ink and other debris from water used in offset printing.

2. Discussion of the Prior Art

Water is used in large amounts in offset printing. The water becomes contaminated with ink during the printing process. The ink is removed from the water to recycle the water for further use. It is common for large printing operations to spend $700 every two weeks to replace non-cleanable ink removal devices for their printing presses.

Accordingly, there is a clearly felt need in the art for an ink removal device, which removes ink and other debris from water used in offset printing and which may be may be cleaned and re-used.

SUMMARY OF THE INVENTION

The present invention provides an ink removal device, which removes ink and other debris from water used in offset printing and may be cleaned. The ink removal device preferably includes a tube housing, a plurality of glass chunks and an injector tube. The tube housing preferably includes a separation plate retained in an inner perimeter of the tube housing. However, the separation plate could be eliminated to create a single chamber. A first chamber is formed on a first side of the separation plate and a second chamber is formed on a second side of the separation plate. The second chamber is preferably larger than the first chamber. It is preferable that a lengthwise axis of the tube housing have a vertical or substantially vertical orientation. A liquid opening is formed through the separation plate. One end of the injector tube is sealed in the water opening. It is preferable that the other end of the injector tube is terminated, such that water does not flow axial out of the other end of the tube. It is preferable to form a T-connection at the other end of the injector tube, such that liquid exits radially from the injector tube.

An outlet tube is formed through a side wall of the tube housing, adjacent to the second side of the separation plate. A liquid inlet connector is secured to a first end of the tube housing for a supply of water contaminated with ink (ink water). If the separation plate is not used, the one end of the injection tube is connected directly to the liquid inlet connector. An air inlet connector is secured to a second end of the tube housing for a supply of pressurized air. The first chamber is preferably filled with a plurality of large chunks of glass. The second chamber is preferably filled with a plurality of small chunks of glass. However, a single chamber ink removal device may be filled with a single size of glass chunks. Pressurized ink water is pumped into the first chamber. The ink water flows into the first chamber, through into injector tube. The ink water exits the second end of the injector tube and passes through the plurality of small glass chunks in the second chamber. The ink in the ink water adheres to the plurality of glass chunks in the second chamber to produce cleaned water. The pressurized air works its way through the plurality of small glass chunks and dries the ink adhering to the plurality of small glass chunks. The cleaned water exits the outlet port to be used for printing operations.

Accordingly, it is an object of the present invention to provide an ink removal device, which removes ink and other debris from water used in offset printing.

Finally, it is another object of the present invention to provide an ink removal device, which may be may be cleaned and re-used.

These and additional objects, advantages, features and benefits of the present invention will become apparent from the following specification.

DETAILED DESCRIPTION OF THE PREFERRED EMBODIMENTS

Figures 1, 2, 3:
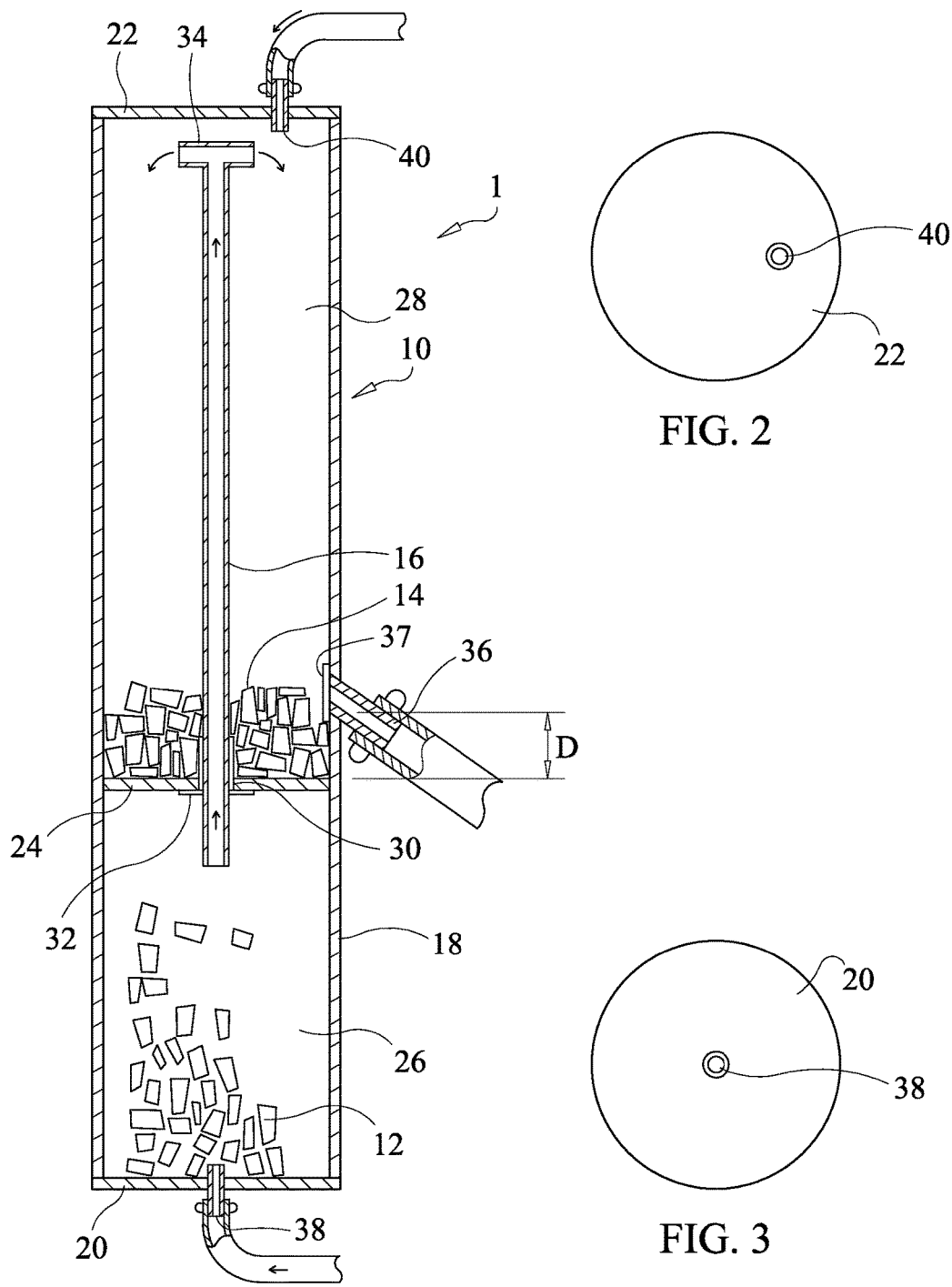
FIG. 1 is a cross sectional view of an ink removal device in accordance with the present invention.
FIG. 2 is an end view of a second end of an ink removal device in accordance with the present invention.
FIG. 3 is an end view of a first end of an ink removal device in accordance with the present invention.

With reference now to the drawings, and particularly to FIG. 1, there is shown a cross sectional view of an ink removal device 1. With reference to FIGS. 2-3, the ink removal device 1 preferably includes a tube housing 10, a plurality of large glass chunks 12, a plurality of small glass chunks 14 and an injector tube 16. The tube housing 10 preferably includes a tubular body 18, a first end plate 20 and a second end plate 22. The first end plate 20 is attached to a first end of the tubular body 18 and the second plate 22 is attached to a second end of the tubular body 18. A separation plate 24 is preferably retained in an inner perimeter of the tubular body 18. It is preferable that the tube housing 10 have a vertical or substantially vertical orientation. A first chamber 26 is formed on a first side of the separation plate 24 and a second chamber 28 is formed on a second side of the separation plate 24. The second chamber 28 is preferably larger than the first chamber 26.

Preferably, a water opening 30 is formed through the separation plate 24 to receive a tube fitting 32 or the like. The tube fitting 32 is sealed in the water opening 30. One end of the injector tube 16 is sealed in the tube fitting 32. It is preferable that the one end of the injector tube 16 extend into the first chamber 26 and that the other end of the injector tube 16 be terminated, such that liquid does not flow axially out of the other end of the injector tube 16. It is preferable to form a T-connection 34 at the other end of the injector tube 16, such that liquid exits radially from the injector tube 16.

An outlet tube 36 is formed through a side wall of the tubular body 18, adjacent to the second side of the separation plate 24. The outlet tube 36 is also located in substantially a middle of the tubular body 18. A screen 37 is preferably inserted in front of an entrance to the outlet tube 36 to prevent particles from flowing out through the outlet tube 36. The outlet tube 36 is located a distance "D" from the second side of the separation plate 24 to create a "dead area" below the outlet tube 36. Paper fiber particles and other debris are allowed to collect in the dead area.

A liquid inlet connector 38 is secured to the first end plate 20 to supply water contaminated with ink (ink water). An air inlet connector 40 is secured to the second end plate 22 of the tube housing for supplying pressurized air. The first chamber 26 is filled with the plurality of large chunks of glass 12. The size of the large chunks of glass 12 preferably range from ½ inch to 3 inches in diameter, but other sizes may also be used. The second chamber 28 is filled with the plurality of small chunks of glass 14. The size of the small chunks of glass 14 preferably range from ⅛ inch to 2 inches in diameter, but other sizes may also be used. However, a single range or size of glass chunks may also be used. Although, the plurality of glass chunks do not need to have any specific shape, it is preferable that the plurality of glass chunks have planar or substantially planar surfaces for adhering ink.

Pressurized ink water is pumped into the first chamber 26 through the liquid inlet connector 38 and into injector tube 16. The ink water exits the second end of the injector tube 16 through the T-connection 34 and passes through the plurality of small glass chunks 14 in the second chamber 14. The ink in the ink water adheres to the plurality of small chunks of glass 14 in the second chamber 28 to produce cleaned water. The pressurized air works its way through the plurality of small glass chunks 14 and dries the ink adhering to the plurality of small glass chunks 14. The cleaned water exits the outlet tube 36 for use in printing operations.

Figure 4:
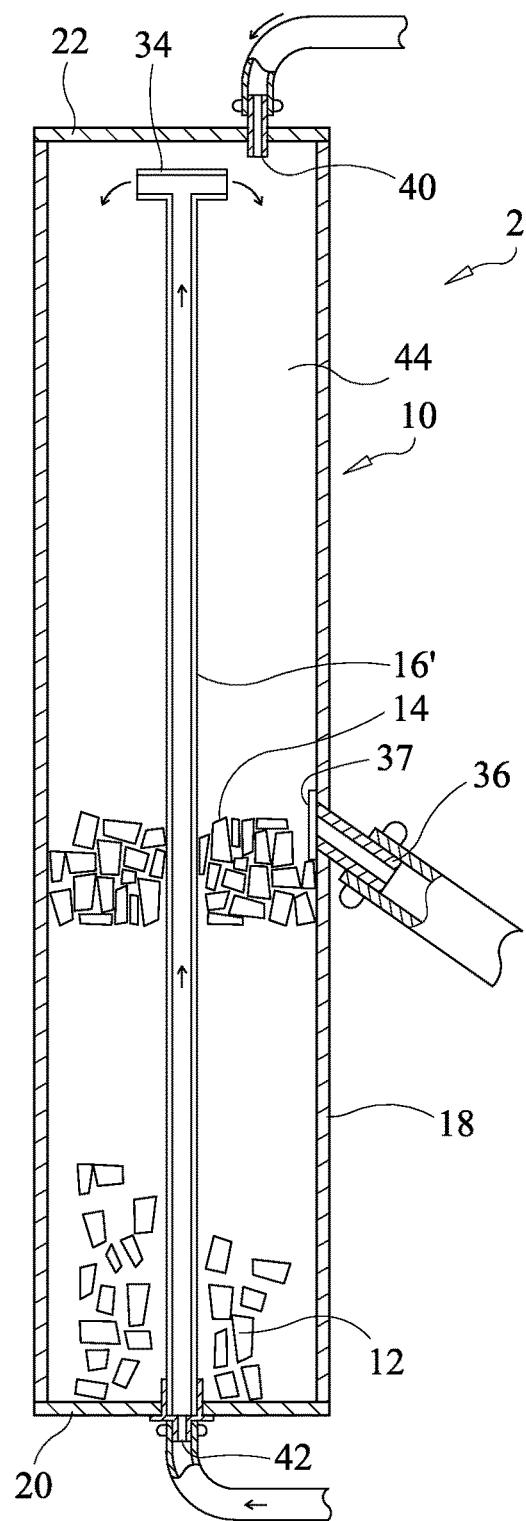
FIG. 4 is a cross sectional view of an ink removal device without a separation plate in accordance with the present invention.

With reference to FIG. 4, an ink removal device 2 includes the tube housing 10, a plurality of glass chunks and an injector tube 16'. One end of the injection tube 16' is connected directly to a liquid inlet connector 42. The liquid inlet connector 42 is secured to the first end plate 20. The plurality of glass chunks in an inner perimeter of the tubular body 18 (chamber 44) could be large glass chunks 12 and small glass chunks 14 or just one size or range of sizes.

Pressurized ink water is pumped into the chamber 44 through the liquid inlet connector 42 and into injector tube 16. The ink water exits the second end of the injector tube 16 through the T-connection 34 and passes through the plurality of small glass chunks 14 in the chamber 44. The ink in the ink water adheres to the plurality of small chunks of glass 14 in the chamber 44 to produce cleaned water. The pressurized air works its way through the plurality of small glass chunks 14 and dries the ink adhering to the plurality of small glass chunks 14. The cleaned water exits the outlet tube 36 for use in printing operations.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of recycling water contaminated with ink, comprising the steps of:
   providing a first chamber and a second chamber, said second chamber is located above said first chamber, said first chamber communicates with said second chamber;
   retaining a plurality of glass chunks in said first and second chambers;
   flowing water contaminated with ink through said first chamber to said second chamber, the ink in the flowing water adhering to said plurality of glass chunks in said second chamber;
   forcing air through said plurality of glass chunks to dry ink to said plurality of glass chunks, said air flowing from an inlet in substantially a top of said second chamber; and
   locating a water outlet between a top and a bottom of said plurality of glass chunks in said second chamber; and
   draining water remaining in said second chamber through said water outlet formed in a sidewall of said second chamber,
   providing a tube housing having a tubular body, a bottom end plate and a top end plate, said first and second chambers are formed inside said tube housing;
   locating an injector tube inside said tube housing, injecting the water contaminated with ink into one end of said injector tube, an opposing end of said injector tube being located near said top end plate, the water contaminated with ink flowing out of said opposing end into said plurality of glass chunks.

2. The method of recycling water contaminated with ink of claim 1, further comprising the step of:
   flowing water contaminated with ink radially out of said opposing end of said injector tube.

3. The method of recycling water contaminated with ink of claim 1, further comprising the step of:
   terminating an opposing end of said injector tube with a T-connector.

4. The method of recycling water contaminated with ink of claim 1, further comprising the step of:
   said plurality of glass chunks in said first chamber are larger than said plurality of glass chunks in said second chamber.

5. A method of recycling water contaminated with ink, comprising the steps of:
   providing a first chamber and a second chamber, said second chamber is located above said first chamber, said first chamber communicates with said second chamber;
   retaining a plurality of glass chunks in said first and second chambers;
   flowing water contaminated with ink through an inlet formed in substantially a bottom of said first chamber, retaining an injector tube in said second chamber, an entrance to said injector tube protrudes into said first chamber, an outlet of said injector is located at substantially a top of said second chamber, the ink in the flowing water adhering to said plurality of glass chunks in said second chamber;
   forcing air through said plurality of glass chunks to dry ink to said plurality of glass chunks in said second chamber, said air flowing from an inlet in substantially a top of said second chamber; and
   locating a water outlet between a top and a bottom of said plurality of glass chunks in said second chamber; and
   draining water remaining in said second chamber through said water outlet formed in a sidewall of said second chamber.

6. The method of recycling water contaminated with ink of claim 5, further comprising the step of:
   providing a tube housing having a tubular body, a bottom end plate and a top end plate, said first and second chambers are formed inside said tube housing.

7. The method of recycling water contaminated with ink of claim 5, further comprising the step of:
   flowing water contaminated with ink radially through said injector tube.

8. The method of recycling water contaminated with ink of claim 5, further comprising the step of:
   terminating an opposing end of said injector tube with a T-connector.

9. The method of recycling water contaminated with ink of claim 5, further comprising the step of:

said plurality of glass chunks in said first chamber are larger than said plurality of glass chunks in said second chamber.

* * * * *